C. E. LORD.
METHOD OF AND MEANS FOR CONTROLLING ALTERNATING CURRENT MOTORS.
APPLICATION FILED AUG. 27, 1906. RENEWED SEPT. 11, 1908.
1,115,948.
Patented Nov. 3, 1914.
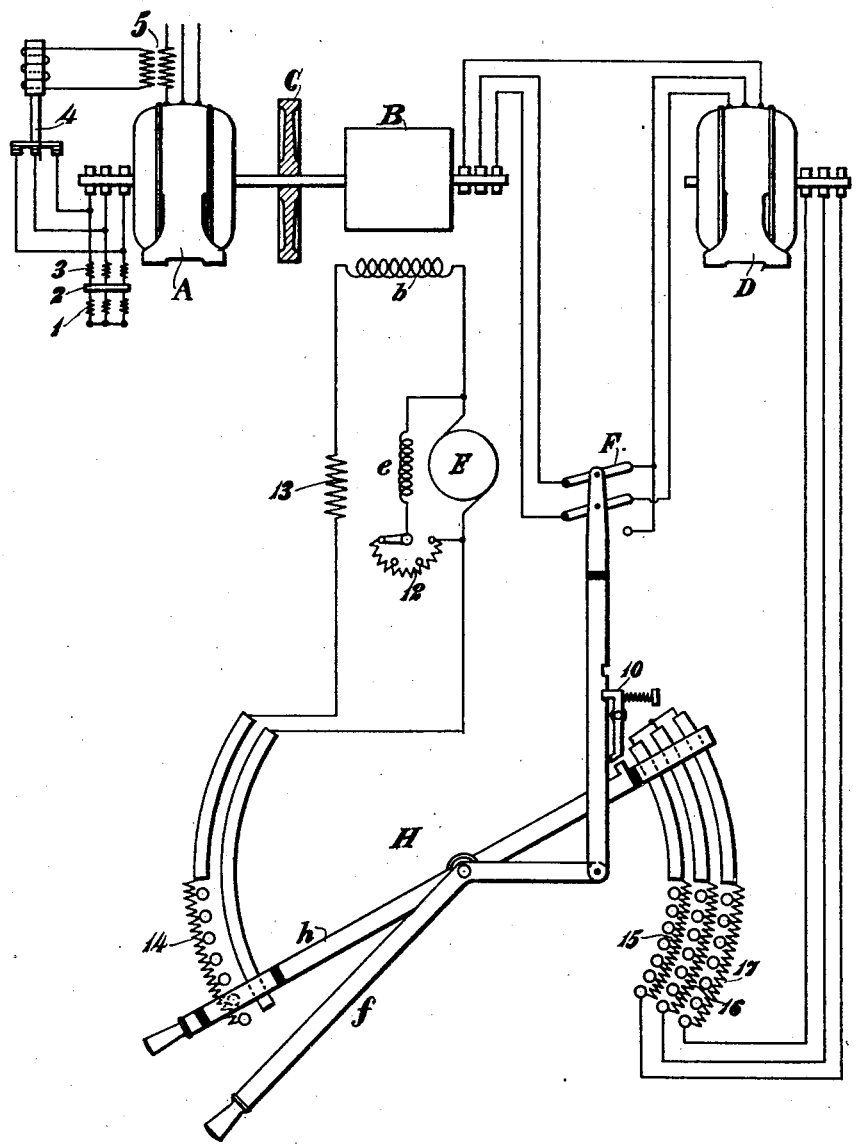
WITNESSES
INVENTOR

UNITED STATES PATENT OFFICE.

CHARLES E. LORD, OF NORWOOD, OHIO.

METHOD OF AND MEANS FOR CONTROLLING ALTERNATING-CURRENT MOTORS.

1,115,948. Specification of Letters Patent. Patented Nov. 3, 1914.

Application filed August 27, 1906, Serial No. 332,133. Renewed September 11, 1908. Serial No. 452,661.

*To all whom it may concern:*

Be it known that I, CHARLES E. LORD, citizen of the United States, residing at Norwood, in the county of Hamilton and State of Ohio, have invented certain new and useful Improvements in Methods of and Means for Controlling Alternating-Current Motors, of which the following is a full, clear, and exact specification.

My invention relates to motor control systems and particularly to control systems for alternating current mill and hoisting motors.

In rolling mills and in mine hoisting machinery it is necessary that the moving parts be quickly and often reversed. Heretofore steam engines have generally been used for this work, but these have been cumbersome and complicated, their operation has been uneconomical, and their control has been extremely difficult and altogether unsatisfactory.

The object of my present invention is to simplify the operation and control of rolling mills and mine hoisting machinery. This is accomplished by means of an economically operated and readily controlled arrangement of alternating current dynamo-electric machines.

In one aspect my present invention comprises the method of operating an induction motor at variable speed which consists in inversely varying the potential impressed upon its primary member and the resistance of its secondary member.

In one aspect my invention consists of a motor control system comprising an induction motor, an alternating current generator for supplying said motor, and means for varying the electromotive force of said generator and the resistance of the secondary circuit of said motor.

In a still more specific aspect my invention consists in a system of motor control comprising a source of current, a motor supplied thereby, a fly-wheel mechanically connected to said motor, an alternating current generator driven by said motor, an induction motor supplied by said generator, and means for inversely varying the field strength of said alternating current generator and the resistance of the secondary circuit of said induction motor.

Other features of my invention will appear from the following description and accompanying drawings, and will be particularly pointed out in the appended claims.

The single figure of the drawings shows diagrammatically one embodiment of my invention.

In this figure A is an electric motor of the three-phase induction type, though obviously other forms of motors could be used instead. In the rotor circuit of this motor is a starting resistance 1 adjustable by means of a short-circuiting bar 2, and a regulating resistance 3 arranged to be cut in and out by a solenoid switch 4, which in turn is responsive to the current strength in the primary circuit of the motor, as through a series transformer 5. Other means for varying the speed of motor A may be used if desired. The armature of a three-phase alternating current generator B is driven by the motor A, being preferably directly connected thereto, and on the common shaft of the motor A and generator B is a heavy fly-wheel C. The generator B supplies current to the primary member of a working motor D of the three-phase induction type. The motor D may be used to drive any desired machinery. Although the generator B and the motor D are shown as three-phase machines it is obvious that my invention is not limited to this number of phases but that the machines B and D may be wound for any number of phases; and it is not necessary that the motor D be an induction motor, as other types of alternating current motors may be used.

The field coil $b$ of generator B is supplied by an exciter E, having a self excited field $e$, the strength of which can be controlled by the rheostat 12. Any other direct current source may be used to supply the field coil $b$.

The controller H is arranged to control the resistance 14 in the circuit of the field coil $b$ and also the resistances 15, 16 and 17 in the secondary or rotor circuit of the working motor D. The two ends of the arm $h$ of the controller H are electrically distinct, and control the resistance 14, and the resistances 15, 16 and 17 respectively. As shown, a movement of handle $h$ varies successively the two sets of resistances, first cutting the resistance 14 out of the field circuit $b$ and then cutting the resistances 15, 16 and 17 out of the secondary circuit of the motor D. The cutting out of resistance 14 increases the potential of generator B thereby increasing the speed of motor D in the manner of the well known potential starter. The cutting out of the resistances 15, 16 and 17 further increases the speed of motor D, by decreasing the resistance of the circuit of the wound rotor thereof in the manner of the well known resistance starters for induction motors.

In the primary circuit of the motor D is a reversing switch F, operable by the handle $f$. A spring-pressed latch 10 when released locks the reversing switch F in whichever position it may be. The reversing switch F is released from the latch 10 only when the arm $h$ of the controller H has been moved as far as possible counter-clockwise, at which time the full resistance 14 is in circuit with the field coil $b$.

A non-inductive resistance 13 is connected in series with the field coil $b$. This resistance has an ohmic value several times as great as that of the field coil with which it is in series. The purpose of this resistance is to diminish the time constant of the field magnet $b$, for the time constant of a circuit is a function of its inductance divided by its resistance. Therefore by increasing the resistance of the field circuit without increasing its inductance, the current strength being kept the same, the time constant of the field magnet is greatly reduced. By this means quick reversals of the motor D may be more readily obtained.

The operation of the system is as follows:—The primary circuit of motor A is closed and the motor started by moving bar 2 to cut out the starting resistance 1. The switch 4 is held open by its solenoid at this time because of the heavy current required for starting the motor. If desired, other means may be used to insure the open condition of this switch during starting. After the motor has gained sufficient speed and the starting resistance has been cut out, the solenoid switch is allowed to close to cut out resistance 3 because of the decrease in the primary current of motor A. The fly-wheel C and the generator armature B are also started with the motor A and the fly-wheel stores mechanical energy by its rotation. During this starting the arm $h$ is preferably in the position in which all the resistance 14 is in circuit or the circuit including such resistance is open, and the reversing switch F is preferably open. The handle $f$ is now moved to close switch F in the proper position to give the motor D the desired direction of rotation, and the arm $h$ is moved in a clockwise direction. The movement of the arm $h$ gradually cuts the resistance 14 out of circuit with coil $b$, thereby increasing the electromotive force impressed upon the primary member of the motor D. When the entire resistance 14 has been cut out of circuit the field coil $b$ is at its strongest and the electromotive force impressed by the armature of generator B upon the motor D has reached its maximum. So far the resistances 15, 16 and 17 in the secondary circuit of motor D have remained unchanged. After resistance 14 has been fully cut out, a further movement of arm $h$ gradually cuts the resistances 15, 16 and 17 out of their circuit and diminishes the resistance of the secondary member of motor D, thereby diminishing the slip of said motor. The cutting out of resistance 14 and of the resistances 15, 16 and 17 both increase the speed of motor D. The speed which this motor acquires depends upon the extent of movement of the arm $h$, the full speed being reached when the resistances 15, 16 and 17 have been fully cut out of circuit.

If the load on the working motor increases, said motor requires more power for its operation than the motor A can furnish. The current rising in the primary of transformer 5 by reason of this heavy load, the switch 4 is opened, thus inserting resistance 3 into the rotor circuit of motor A. This increases the slip of motor A and permits said motor to slow down, thus allowing the fly-wheel C to give up some of the energy it has stored, which energy helps the motor A to drive the generator B to supply electrical energy at the rate demanded by the motor D to drive its load.

As the arm $h$ is moved backward or in a counter-clockwise direction, the resistances 15, 16 and 17 are first cut into the secondary circuit of the working motor to increase the slip thereof, and then the resistance 14 is cut into circuit with the field coil $b$. Both of these changes allow the motor D to slow down. The diminished current in the primary of transformer 5 also causes the solenoid switch 4 to close, thereby increasing the speed of motor A so that the latter may again supply energy to the fly-wheel C. The fly-wheel thus stores up any excess of energy supplied when the rate of such supply exceeds the rate at which energy is demanded by the working motor, and gives up said stored energy whenever the rate of energy demanded is greater than the rate of energy supplied. When the arm $h$ has been moved as far as possible counter-clockwise the switch F is released from its catch 10 and can be thrown to its other position to reverse the motor D, when the above cycle may be repeated, save that the motor D is caused to rotate in the other direction.

When I use the term "inversely" in this description and in the claims I do not wish to limit myself to exact "inverse proportion," but intend the term to include any increase in one and decrease in the other of the two things specified.

I have described my invention in what I now consider its preferred form but I intend to cover in the claims all those obvious modifications which readily occur to one skilled in the art.

Having thus described my invention, what I claim as new and desire to secure by Letters Patent is:—

1. The method of operating an alternating current motor at variable speed, which consists in inversely varying the potential impressed upon its primary member and the resistance of the circuit of its secondary member.

2. The method of operating an induction motor at a variable speed, which consists in successively and inversely varying the potential impressed upon its primary member and the resistance of the circuit of its secondary member.

3. The method of operating an induction motor at variable speed, which consists in inversely varying the potential impressed upon its primary member and the resistance of the circuit of its secondary member, storing as mechanical energy any excess of supplied energy when the load on the motor is light, and supplying said stored energy to the motor as electrical energy when the load on the motor is heavy.

4. The method of operating an alternating current motor at variable speed and load, consisting in successively and inversely varying the electromotive force applied to its primary member and the resistance of the circuit of its secondary member, storing as mechanical energy the excess of energy when the supplied power exceeds the power demanded by the load and supplying said stored energy to the motor as electrical energy when the power demanded by the load exceeds the supplied power.

5. A system of motor control, comprising an alternating current motor, a generator for supplying said motor, and means for varying the electromotive force of said generator and the resistance of the secondary circuit of said motor.

6. A system of motor control, comprising an induction motor, an alternating current generator for supplying said motor, and means for inversely varying the electromotive force of said generator and the resistance of the secondary circuit of said motor.

7. A system of motor control, comprising an induction motor, a generator for supplying said motor, resistances in the field circuit of said generator and the secondary circuit of said motor respectively, and a unitary means for varying said resistances.

8. A system of motor control, comprising an induction motor, an alternating current generator for supplying said motor, resistances in the field circuit of said generator and the secondary circuit of said motor respectively, and a unitary means for varying said resistances successively.

9. A system of motor control, comprising an alternating current motor, an alternating current generator for supplying said motor, resistances associated with said generator and said motor respectively, a single means for controlling said resistances, and a reversing switch for said motor arranged to be locked against movement save when the resistance associated with the generator is all in circuit.

10. A system of motor control, comprising an induction motor, an alternating current generator for supplying said motor, resistances in the field circuit of said generator and the secondary circuit of said motor respectively, a reversing switch for said motor, and means for locking said reversing switch save when the resistance in the generator field circuit is a maximum.

11. A system of motor control, comprising an alternating current motor, a generator for supplying said motor, means for varying the electromotive force of the generator and the resistance of the secondary circuit of said motor, a reversing switch for said motor, and means for locking said reversing switch save when the electromotive force of the generator is a minimum.

12. A system of motor control, comprising an alternating current motor, a generator for supplying said motor, means for successively and inversely varying the electromotive force of said generator and the resistance of the secondary circuit of said motor, and a fly-wheel mechanically connected to said generator.

13. In combination, a source of power, an alternating current generator driven thereby, a fly-wheel mechanically connected to the generator, an alternating current motor supplied by said generator, and means for inversely varying the electromotive force of said generator and the resistance of the secondary circuit of said motor.

14. In combination, a source of current, a motor supplied thereby, a fly-wheel mechanically connected to said motor, an alternating current generator driven by said motor, an induction motor supplied by said generator, and means for inversely varying the field strength of said alternating current generator and the resistance of the secondary circuit of said induction motor.

15. In combination, a source of power, an alternating current generator driven thereby, an induction motor supplied by the generator, means for successively varying resistances in the field circuit of the generator and the secondary circuit of the motor respectively, a fly-wheel on the generator shaft, and means for allowing said fly-wheel to give up its energy when the motor load rises above normal.

16. A system of motor control, comprising an alternating current generator, an alternating current motor supplied thereby, means for successively varying the field strength of said generator and the resistance of the secondary circuit of said motor, and a resistance permanently in the field circuit of said generator.

17. A system of motor control, comprising an induction motor, an alternating current generator driven thereby, a fly-wheel on the shaft of said induction motor, an alternating current working motor supplied by said generator, and means for successively and inversely varying the field strength of the generator and the resistance of the secondary circuit of the working motor.

18. A system of motor control, comprising an induction motor, an alternating current generator driven thereby, a fly-wheel on the shaft of said induction motor, an alternating current working motor supplied by said generator, means for successively and inversely varying the field strength of the generator and the resistance of the secondary circuit of the working motor, and means for increasing the slip of the induction motor when a heavy load is placed on the working motor.

19. A system of motor control, comprising an alternating current motor, an alternating current generator supplying said motor, means for varying the electro-motive force of said generator, a reversing switch for said motor, and means for preventing the operation of said reversing switch save when the electro-motive force of said generator is a minimum.

20. A system of motor control, comprising an alternating current motor, an alternating current generator for supplying said motor, resistances associated with said generator and said motor respectively, single means for controlling said resistances, and a reversing switch for said motor arranged to be locked against movement save when the resistance associated with the motor is all in circuit.

21. A system of motor control, comprising an alternating current motor, an alternating current generator for supplying said motor, unitary means for varying the voltage of said generator and effective resistance in the secondary circuit of said motor, and means for reversing the circuit connections of said motor, said reversing means being operable only when the maximum motor slip exists under normal operating conditions.

22. A system of motor control, comprising an alternating current motor, an alternating current generator for supplying said motor, unitary means for varying the voltage of said generator and effective resistance in the secondary circuit of said motor, and means controlling the direction of rotation of said motor, said controlling means being operable only when the maximum motor slip exists under operating conditions.

23. A system of motor control, comprising an alternating current motor, an alternating current generator for supplying said motor, unitary means for varying the voltage of said generator and effective resistance in the secondary circuit of said motor, and means for reversing circuit connections of said motor, said reversing means being rendered operable by said unitary means.

24. A system of motor control, comprising an alternating current motor, an alternating current generator for supplying said motor, unitary means for varying the voltage of said generator and effective resistance in the secondary circuit of said motor, and means for controlling the direction of rotation of said motor, said controlling means being rendered operable by said unitary means.

25. A system of motor control, comprising an alternating current motor, an alternating current generator for supplying said motor, resistances associated with said generator and said motor respectively, single means for controlling said resistances, and a reversing switch for said motor arranged to be locked against movement save when the resistance associated with the motor is all in circuit, said reversing switch being controlled by said single means.

26. A system of motor control, comprising an alternating current motor, an alternating current generator for supplying said motor, resistances associated with said generator and said motor respectively, unitary means for controlling said resistances, and a reversing switch for said motor being rendered operative by said unitary means under certain predetermined conditions and being arranged to be locked against movement save when the resistance associated with said motor is all in circuit.

27. A system of motor control, comprising an alternating current motor, a generator for supplying said motor, means for varying the electromotive force of said generator and the resistance of the secondary circuit of said motor, and means adapted to be controlled by said first mentioned means for controlling the direction of rotation of said motor.

28. A system of motor control, comprising an alternating current motor, a generator for supplying said motor, means for varying the electromotive force of said generator and the resistance of the secondary circuit of said motor, and a reversing switch for said motor adapted to be controlled by said means for controlling the direction of rotation of said motor.

29. A system of motor control, comprising an alternating current motor, a generator for supplying said motor, unitary means for varying the electromotive force of said generator and the resistance of the secondary circuit of said motor, a reversing switch adapted to be controlled by said unitary means for controlling the direction of rotation of said motor.

30. A system of motor control, comprising an induction motor, an alternating current generator for supplying said motor, means for inversely varying the electromotive force of said generator and the resistance of the secondary circuit of said motor, and means adapted to be controlled by said first mentioned means for controlling the direction of rotation of said motor.

31. A system of motor control, comprising an induction motor, a generator for supplying said motor, resistances in the field circuit of said generator and the secondary circuit of said motor respectively, unitary means for varying said resistances, and means adapted to be rendered operative by said unitary means for controlling the direction of rotation of said motor.

32. A system of motor control, comprising an induction motor, a generator for supplying said motor, resistances in the field circuit of said generator and the secondary circuit of said motor respectively, unitary means for varying said resistances, and a reversing switch for said motor adapted to be controlled by said unitary means under certain predetermined conditions.

33. A system of motor control, comprising an induction motor, an alternating current generator for supplying said motor, resistances in the field circuit of said generator and the secondary circuit of said motor respectively, unitary means for varying said resistances respectively, and means adapted to be controlled by said unitary means for controlling the direction of rotation of said motor.

34. In a system of motor control, comprising an alternating current motor, an alternating current generator for supplying said motor, resistances associated with said generator and said motor respectively, single means for controlling said resistances, a reversing switch for said motor adapted to be operated only when the resistance associated with the generator is all in circuit.

35. A system of motor control, comprising an induction motor, an alternating current generator for supplying said motor, resistances in the field circuit of said generator and the secondary circuit of said motor respectively, a reversing switch for said motor, and means adapted to operate said switch only when the resistance in the generator field circuit is a maximum.

36. A system of motor control, comprising an alternating current motor, a generator for supplying said motor, means for varying the electromotive force of the generator and the resistance of the secondary circuit of said motor, a reversing switch for said motor, and means adapted to operate said switch only when the electromotive force of the generator is a minimum.

37. A system of motor control, comprising an alternating current motor, a generator for supplying said motor, means for successively and inversely varying the electromotive force of said generator and the resistance of the secondary circuit of said motor, means for controlling the direction of rotation of said motor and adapted to be rendered operative by said first mentioned means, and a fly-wheel mechanically connected to said generator.

38. In combination, a source of power, an alternating current generator driven thereby, a fly-wheel mechanically connected to the generator, an alternating current motor supplied by said generator, means for inversely varying the electromotive force of said generator and the resistance of the secondary circuit of said motor, and means for controlling the direction of rotation of said motor and adapted to be rendered operative by said first mentioned means.

39. In combination, a source of current, a motor supplied thereby, a fly-wheel mechanically connected to said motor, an alternating current generator driven by said motor, an induction motor supplied by said generator, means for inversely varying the field strength of said alternating current generator and the resistance of the secondary circuit of said induction motor, and means for controlling the direction of rotation of said motor and adapted to be controlled by said first mentioned means.

40. In combination, a source of power, an alternating current generator driven thereby, an induction motor supplied by said generator, means for successively varying the resistances in the field circuit of the generator and the secondary circuit of the motor respectively, means for controlling the direction of rotation of said motor and adapted to be controlled by said first mentioned means, a fly-wheel on the generator shaft, and means for allowing said fly-wheel to give up its energy when the motor load rises above normal.

41. A system of motor control, comprising an alternating current generator, an alternating current motor supplied thereby, means for successively varying the field strength of said generator and the resistance of the secondary circuit of said motor, means for controlling the direction of rotation of said motor and adapted to be rendered operative by said first mentioned means, and a resistance permanently in the field circuit of said generator.

42. A system of motor control, comprising an induction motor, an alternating current generator driven thereby, a fly-wheel on the shaft of said induction motor, an alternating current working motor supplied by said generator, means for successively and inversely varying the field strength of the generator and the resistance of the secondary circuit of the working motor, and means for controlling the direction of rotation of said motor and adapted to be controlled by said first mentioned means.

43. A system of motor control, comprising an induction motor, an alternating current generator driven thereby, a fly-wheel on the shaft of said induction motor, an alternating current working motor supplied by said generator, means for successively and inversely varying the field strength of the generator and the resistance of the secondary circuit of the working motor, means for controlling the direction of rotation of said motor and adapted to be rendered operative by said first mentioned means, and means for increasing the slip of the induction motor when a heavy load is placed on the working motor.

In testimony whereof I affix my signature, in the presence of two witnesses.

CHARLES E. LORD.

Witnesses:
 RUBY ROBINSON,
 FRED J. KINSEY.